United States Patent
Fly et al.

(10) Patent No.: US 12,149,553 B1
(45) Date of Patent: Nov. 19, 2024

(54) VISIBILITY INTO SECURITY

(71) Applicant: Mimecast North America, Inc., Lexington, MA (US)

(72) Inventors: Robert Charles Fly, Moraga, CA (US); Matan Gal Kochavi, Oakland, CA (US); Michael Steven Ledbetter, Emeryville, CA (US)

(73) Assignee: Mimecast North America, Inc., Lexington, MA (US)

( * ) Notice: Subject to any disclaimer, the term of this patent is extended or adjusted under 35 U.S.C. 154(b) by 344 days.

(21) Appl. No.: 17/515,051

(22) Filed: Oct. 29, 2021

(51) Int. Cl.
*H04L 29/00* (2006.01)
*H04L 9/40* (2022.01)

(52) U.S. Cl.
CPC ........ *H04L 63/1433* (2013.01); *H04L 63/102* (2013.01); *H04L 63/105* (2013.01)

(58) Field of Classification Search
CPC .. H04L 63/1433; H04L 63/102; H04L 63/105
See application file for complete search history.

(56) References Cited

U.S. PATENT DOCUMENTS

| | | | |
|---|---|---|---|
| 9,807,094 B1* | 10/2017 | Liu | H04L 63/102 |
| 10,505,959 B1* | 12/2019 | Wang | G06N 20/00 |
| 10,887,337 B1* | 1/2021 | Kim | H04L 63/1433 |
| 11,128,463 B1* | 9/2021 | Thompson | G16Y 40/10 |
| 11,250,142 B1* | 2/2022 | Wu | H04L 9/0819 |
| 11,606,373 B2* | 3/2023 | Dunn | G06F 18/232 |
| 2015/0101050 A1* | 4/2015 | Nielson | G06F 21/552 726/23 |
| 2016/0004862 A1* | 1/2016 | Almehmadi | G06F 21/6218 726/25 |
| 2017/0126710 A1* | 5/2017 | De-Levie | H04L 63/1425 |
| 2017/0244730 A1* | 8/2017 | Sancheti | H04L 63/205 |
| 2017/0295197 A1* | 10/2017 | Parimi | H04L 63/10 |
| 2018/0191506 A1* | 7/2018 | Vilvovsky | H04L 9/14 |
| 2019/0028504 A1* | 1/2019 | Shtar | H04L 67/535 |
| 2019/0098039 A1* | 3/2019 | Gates | G16H 20/70 |
| 2019/0158513 A1* | 5/2019 | Shtar | G06F 21/552 |
| 2020/0244698 A1* | 7/2020 | Pal | H04L 63/1466 |
| 2020/0265356 A1* | 8/2020 | Lee | G06F 17/18 |
| 2020/0302074 A1* | 9/2020 | Little | G06F 21/6218 |
| 2021/0006542 A1* | 1/2021 | Myneni | H04L 63/20 |
| 2021/0058422 A1* | 2/2021 | Obrecht | H04L 63/1416 |
| 2021/0209229 A1* | 7/2021 | Wu | G06F 16/285 |
| 2021/0273973 A1* | 9/2021 | Boyer | H04L 63/1416 |
| 2021/0279337 A1* | 9/2021 | Mosby | G06N 20/00 |
| 2021/0392151 A1* | 12/2021 | Lakhani | H04L 63/20 |

(Continued)

*Primary Examiner* — Don G Zhao
(74) *Attorney, Agent, or Firm* — Nutter McClennen & Fish LLP

(57) ABSTRACT

Security event data from each of a plurality of security data sources is received, each unit of the security event data being associated with a security event involving one or more human users included in a monitored set of human users. The security event data is used to generate for each of at least a subset of the monitored set of human users a user-specific security risk score that is determined based at least in part on: a level of access to protected resources that a user has; an attack type that has been attempted with respect to the user; and an action taken by the user, as reflected in the security event data associated with the user from two or more of said security data sources.

20 Claims, 10 Drawing Sheets

(56) References Cited

U.S. PATENT DOCUMENTS

| | | | |
|---|---|---|---|
| 2021/0400060 A1* | 12/2021 | Chacko | H04L 63/20 |
| 2022/0043878 A1* | 2/2022 | Jackson | H04L 9/3231 |
| 2022/0207136 A1* | 6/2022 | Grebennikov | G06F 21/554 |
| 2022/0232031 A1* | 7/2022 | Bogren | H04L 63/1425 |
| 2022/0253531 A1* | 8/2022 | Kim | G06F 11/323 |
| 2023/0214752 A1* | 7/2023 | Saliba | G06Q 10/04 |
| | | | 705/7.28 |
| 2023/0334403 A1* | 10/2023 | Saliba | G06Q 10/06393 |

* cited by examiner

| Phishing (Real World) | | | | | |
|---|---|---|---|---|---|
| ⊟ The risk score for this security action is calculated based on how an employee responds to actual phishing attacks they receive in their inbox. | | | | | |
| Security Action | Events | Elevate Default Score | Customer Score | Score Details | |
| Real World Phishing<br><br>*Desired actions increase your score* | no data | N/A | | weight (relative to other behaviors) | 1 |
| | delivered | 75 | | scoring period (in months) | 24 |
| | clicked | 0 | | default score | 50 (only for first campaign) |
| | reported | 100 | | The score is calculated based on the number on the type of incident and the threat category associated with that incident.<br><br>Each incident is averaged with all other incidents in the scoring period.<br><br>Example:<br><br>• Employee has three incidents an imposter email that is clicked on (0*1) = 0, a malware email that they reported (1*100), and a spam email they clicked on, then reported (0.5*50) resulting in a score of 41. | |
| | clicked & reported | 50 | | | |
| | threat category weights | default: 1.0<br>impostor: 1.0<br>malware: 1.0<br>phish: 1.0<br>legitimate: 0.0<br>spam: 0.5 | | | |
| Outstanding questions for customer before finalizing scoring configurations | | | | | |

FIG. 2C

Pulse Block

You can configure the Pulse block based on if you are sending reporting AND/OR clicked events. Pulse displays based on the data from the last 12 months.

☐ Option 1: default

If an employee has clicked on phishing attacks they will see a red x next to "Real Phishing Attacks were Detected"

If an employee has not reported any phishing attacks they will see a red x next to "Real Phishing Attacks were Reported"

> Real-world Phishing Attacks
>
> We use technology to prevent phishing attacks, but no technology is perfect and sometimes they get through. Here's how your recent actions have impacted your score.
>
> ⊗ No Real Phishing Attacks were Detected
> ⊗ No Real Phishing Attacks were Reported
>
> 

☐ Option 2: show threat category

Show a breakdown in what was reported and clicked by the threat categories of the attack.

> Real-world Phishing Attacks
>
> We use technology to prevent phishing attacks, but no technology is perfect and sometimes they get through. Here's how your recent actions have impacted your score.
>
> ⓘ 50% of the Phishing Email Attacks were successfully Detected
>
> | Threat Categories: | Email Attacks: | Detected: |
> |---|---|---|
> | • Imposter | 1 | 0 |
> | • Other | 1 | 1 |
>
> ⊗ No Real Phishing Attacks were Reported
>
> | Threat Categories: | Email Attacks: | Reported: |
> |---|---|---|
> | • Imposter | 1 | 0 |
> | • Other | 1 | 0 |
>
> 

FIG. 2C (Cont.)

| Secure Browsing | | | | | |
|---|---|---|---|---|---|
| ⊟ The risk score for this security action is calculated based on the frequency and severity of secure browsing policy violations. | | | | | |
| Security Action | Events | Elevate Default Score | Customer Score | Score Details | |
| Secure Browsing ☐Option 1: Severity based *(Recom-mended)* *Risky behaviors lead to a decrease in your score.* | Unknown | 0 | | weight (relative to other behaviors) | 1 |
| | Inform-ational | 0 | | scoring period (in months) | 24 |
| | Low | 5 | | default score | 50 |
| | Medium | 10 | | method (categorized incidents are mapped to): severity OR type based | |
| | High | 15 | | When an employee has a secure browsing policy violation their score falls by the # of points for that violation type. If the employee does not have a violation in a given month their score improves by 100 / # of months included in the score. (i.e., 4 points = 100 points / 24 month scoring period) Examples: • Employee starts in March 2020 and does not have policy violation in their first month. They will have a score of 50 for March 2020. • Every month after March 2020 in which they do not have a policy violation their score increases by 4 points until they reach a score of 100. • If they have a policy violation with a critical event or block designation their score will drop by 100 points from where the score is at that time, but will not fall below zero and become a negative score. | |
| | Critical | 20 | | | |
| Secure Browsing ☐Option 2: Type based | Alert | 25 | | | |
| | Block | 100 | | | |
| | Block Continue | 75 | | | |
| | Unknown | 0 | | | |
| Outstanding questions for customer before finalizing scoring configurations | | | | | |

FIG. 2D

Pulse Block

Any incidents from the last 12 months will contribute to the visual in Pulse.

☐ Option 1: default

ⓘ Secure Browsing

Our security tools detected you recently tried to access a site that was blocked because it was not considered acceptable for work use and/or was in violation of our policies. This includes sites that contain adult, violence, or gambling etc.

Additionally, our security tools detected you navigated to a site that was blocked because it posed a security threat. Often these sites attempt to introduce malicious software or are disguised with the intent to fraudulently capture sensitive data (i.e., credentials, credit card or personal information).

Additionally, our security tools detected you recently tried to access a site that was blocked because it was known to have malicious or suspicious content. Often these sites host harmful software, spam, or provide unauthorized file sharing that can pose a security risk.

We've detected this risky browsing activity numerous times. In fact, you are 0.2x more likely to browse to a dangerous site than others in your department.

☐ Option 2: show incident details

ⓘ Secure Browsing

Our security tools detected you recently tried to access a site that was blocked because it was not considered acceptable for work use and/or was in violation of our policies. This includes sites that contain adult, violence, or gambling etc.

Additionally, our security tools detected you recently tried to access a site that was blocked because it was known to have malicious or suspicious content. Often these sites host harmful software, spam, or provide unauthorized file sharing that can pose a security risk.

We've detected this risky browsing activity numerous times. In fact, you are 1.8x more likely to browse to a dangerous site than others in your department.

| Violation | Date/Time |
|---|---|
| ⓘ Scam/Questionable Legality | 04/17/2021 at 12:00 AM UTC |
| ⓘ File Transfer | 02/19/2021 at 12:00 AM UTC |
| ⓘ Potentially Unwanted Software | 12/28/2020 at 12:00 AM UTC |

FIG. 2D (Cont.)

Password Manager

☐ The risk score for this security action is calculated based on usage of a password manager, usage of 2FA, and relative security score.

| Security Action | Events | Score Options | Elevate Default Weights | Customer Weights | Score Details | | Pulse Block |
|---|---|---|---|---|---|---|---|
| Password Manager | no events (no data) | n/a | n/a | | weight (relative to other behaviors) | 1 | ☐ Option 1: default<br>Does employee have an active account?<br>⊙ Password Manager<br><br>We recommend installing Lastpass as soon as possible to strengthen access to your accounts.<br>ACME CEO John Doe uses Lastpass, too!<br>50% of your department has installed Lastpass.<br>⊙ Password Manager not installed<br><br>[Install Password Manager]<br><br>☐ Option 2:<br>Does employee use a password manager?<br>(last login is within last 30 days)<br>⊙ Password Manager<br>**********************************<br>********************<br>⊙ ***********************<br>************ |
| *Desired actions increase your score* | active | • true: 100<br>• false: 0 | 1 | | scoring period (in months) | 24 | |
| | multifactor | • true: 100<br>• false: 0 | 0 | | default score | n/a - no score until data is received | |
| | △ There is no Pulse communication that reflects this information to the employee directly | | | | | | |
| | security score (assigned by Vendor) | 0-100 | 0 | | Scores are calculated as a weighted average over weights assigned to each event for password manager.<br><br>Examples:<br>1. Employee has password-manager, but status is inactive. Password manager score will be 0.<br>2. Employee has password-manager, and status is active. Password manager score will be 100. | | |
| | △ There is no Pulse communication that reflects this information to the employee directly | | | | | | |

Outstanding questions for customer before finalizing scoring configurations

FIG. 2E

↓
Account Compromise: 3.5

Account Compromise is <some description of this risk area. Lorem ipsum dolor sit amet consectetur adipiscing elit.> It is calculated based on Attacked Level, Access level, and the following decision areas:

| DECISION AREA | QUICK SUMMARY | DATA SOURCE(S) CONNECTED? | # OF DECISIONS | |
|---|---|---|---|---|
| Phishing | • 2 phishing attempts blocked<br>• 3 months without incident<br>• 2 some other stat | ⊙ Real-world Phishing | (4 decisions) | See Decisions & Events Log > |
| Training & Simulations | • 1 some stat<br>• 41 some other stat<br>• 9 yet another stat tbd | ⊙ Phishing Simulation | (3 decisions) | See Decisions & Events Log > |
| Browsing | • 1 some stat<br>• 36 some other stat | ⊙ Secure Browsing | (2 decisions) | See Decisions & Events Log > |
| Identity | • 8 some stat<br>• 2 some other stat<br>• 0 yet another stat tbd | ⊙ Password Security MFA<br>⊙ Password Manager | (5 decisions) | See Decisions & Events Log > |
| Data Misuse | • 4 some stat<br>• 13 some other stat<br>• 7 yet another stat tbd | ⊙ Sensitive Data Handling | (1 decision) | See Decisions & Events Log > |
| Device Security | No data source provided | ⊙ Unauthorized Software Add source<br>⊙ Device Security Add source | (No data) | |
| Physical Security | No data source provided | ⊙ Clean Desk Add source | (No data) | |

See all 15 decisions & events related to Account Compromise >

FIG. 2F

VISIBILITY INTO SECURITY

BACKGROUND OF THE INVENTION

Computers and networking systems have advanced productivity for society. As computing has advanced, society has entrusted more data including information, knowledge, and wisdom to computers and networks. This has revealed vulnerabilities in society's data as computers and networking systems are not inherently secure without additional effort.

Traditional security products for computers and networking systems focus on technological objects such as antivirus software which scans and quarantines computer viruses. Computers and networking systems still remain vulnerable to computer viruses and malware, identity theft, and ransomware attacks with these traditional products.

BRIEF DESCRIPTION OF THE DRAWINGS

Various embodiments of the invention are disclosed in the following detailed description and the accompanying drawings.

FIG. 2C is an example screenshot of how phishing events may be scored.

FIG. 2D is an example screenshot of how secure browsing events may be scored.

FIG. 2E is an example screenshot of how password manager events may be scored.

FIG. 2F is an example screenshot of connections.

DETAILED DESCRIPTION

Figure 1:
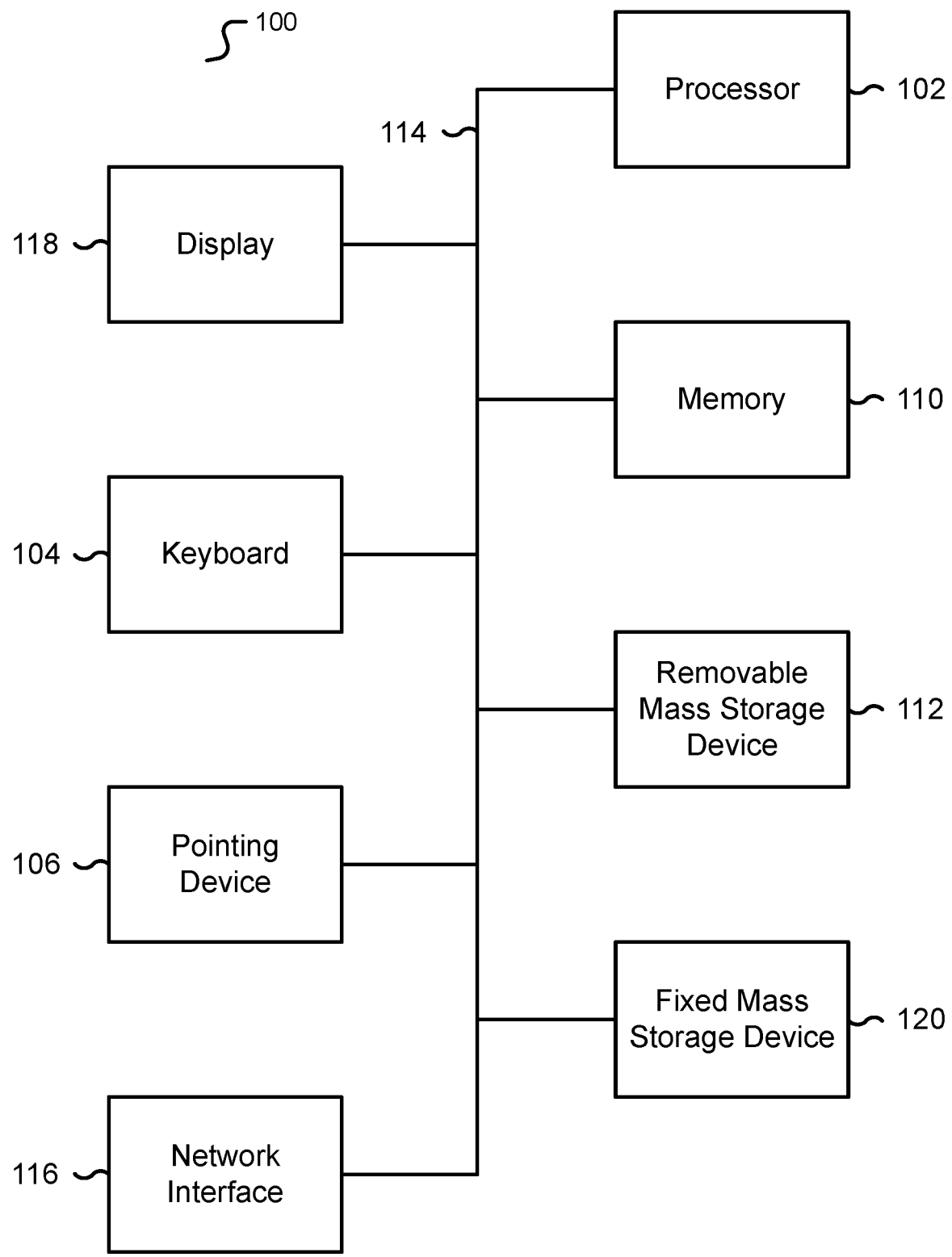
FIG. 1 is a functional diagram illustrating a programmed computer/server system for providing visibility into security in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Determining visibility into human risks such as human risks for security is disclosed. By contrast to traditional computer security techniques which focus on technological objects or processes, addressing human risk is disclosed. As referred to herein without limitation, "insider" risk includes risk from humans including employees, managers, contractors, stakeholders, partners, executives, users, vendors, suppliers, administrators, and/or any human associated with an enterprise with security needs. As referred to herein without limitation, an "enterprise" includes a business, concern, group, governmental organization, non-governmental organization, organization, non-profit, for-profit, charitable organization, family, and/or any plurality of humans.

Every decision that a human such as an insider makes, good and bad, impacts the associated enterprise's security posture. An "insider attack surface," is referred to herein as a function of human's and/or humans' actions, access, attacked frequency, and security controls that impact an organization's risk. Observing the insider attack surface may give greater visibility into the vulnerabilities of an associated enterprise as part of insider attack surface management.

Insider attack surface management may give a deeper understanding of any human with visibility at an individual, group, department, and/or regional level. Insider attack surface management may also help manage controls that help to mitigate and shrink the potential insider attack surface, and insider attack surface management addresses specific threats with specific remediations, for example, without limitation account compromise, data loss, and/or ransomware.

Traditional techniques spend massive resources on security technology and training, but breaches caused by human error remain stubbornly persistent. Traditional security teams may be flooded by incidents, locked in firefighting mode, with little insight into the effectiveness of tools and systems. With better understanding of the actions, access, and the frequency of attacks, and security controls in place to protect insiders, enterprises may benchmark the insider attack surface.

Insider attack surface management takes better advantage of the security tools and systems an enterprise may already have, by consolidating visibility contained in the enterprise security data from IAM (Identity and Access Management), RBAC (Role-Based Access Controls), DLP (Data Loss Prevention), email/web gateways, HR/directory services, and other security data to target the root cause: human error and/or human risk.

Visibility into an enterprise's humans is the foundation of insider attack surface management and provides context to make informed decisions. Absent of real data, traditional security teams have leaned on "awareness & training" as a crutch. Whether or not an insider flunked a security quiz or failed a phishing test is not an actual measure of risk. Instead, one improvement of the disclosed is measuring the insider attack surface using an enterprise's tools and data that it already has. Components of this include:

People-Directory Services, HR Platforms;

Actions-Email Security Gateways (phishing), Web Gateways (internet browsing), Identity Solutions (password security), Endpoint Protection (malware), Data Loss Prevention tools (data handling), and so forth;

Frequency of Attack-Email security gateway (phishing), Web Gateways (phishing, malware), Endpoint (malware), and so forth;

Access-Access Management, Directory Services, Application RBAC; and/or

Security Controls.

Using these components to generate a human "risk score" analogous to a FICO "credit score" in the financial community is disclosed.

What is measured may be managed. Some humans act securely while others are more risky. Once a risk score is established based on any individual human's actions, access, attack frequency, and security controls, an enterprise may establish and/or maintain a full picture of their risk. One improvement of the disclosed is that an enterprise may reduce friction/antagonistic behavior by taking targeted, tailored actions instead of one-size-fits-all controls. As referred to herein, "friction" is the interpersonal pushback, negative feedback, overly onerous security controls, and/or inefficiencies from a human within an enterprise, usually expressed to management, of having to follow a policy. Some management components of this include:

Automating personalized and adaptive policy orchestration in tools to add safety nets for higher risk insiders or loosen controls for less risky insiders;

Zero trust implementations using risk data around authentication or access decisions;

Providing real-time feedback to an insider on their security performance, attacked frequency, or other risks;

Providing tooling to analyst functions that approve things such as access or software downloads;

Automating business workflows based on events, controls, or risk thresholds;

Tailoring software deployments which have higher costs or friction to most risky insiders; and/or Security investment assessments to determine efficacy of rollouts and their impacts to associated humans.

FIG. 1 is a functional diagram illustrating a programmed computer/server system for providing visibility into security in accordance with some embodiments. As shown, FIG. 1 provides a functional diagram of a general purpose computer system programmed to provide visibility into security in accordance with some embodiments. As will be apparent, other computer system architectures and configurations may be used for providing visibility into security.

Computer system (100), which includes various subsystems as described below, includes at least one microprocessor subsystem, also referred to as a processor or a central processing unit ("CPU") (102). For example, processor (102) may be implemented by a single-chip processor or by multiple cores and/or processors or by virtual processors. In some embodiments, processor (102) is a general purpose digital processor that controls the operation of the computer system (100). Using instructions retrieved from memory (110), the processor (102) controls the reception and manipulation of input data, and the output of data on output devices, for example network interface (116) or storage (120).

Processor (102) is coupled bi-directionally with memory (110), which may include a first primary storage, typically a random-access memory ("RAM"), and a second primary storage area, typically a read-only memory ("ROM"). As is well known in the art, primary storage may be used as a general storage area and as scratch-pad memory, and may also be used to store input data and processed data. Primary storage may also store programming instructions and data, in the form of data objects and text objects, in addition to other data and instructions for processes operating on processor (102). Also as well known in the art, primary storage typically includes basic operating instructions, program code, data and objects used by the processor (102) to perform its functions, for example programmed instructions. For example, primary storage devices (110) may include any suitable computer-readable storage media, described below, depending on whether, for example, data access needs to be bi-directional or uni-directional. For example, processor (102) may also directly and very rapidly retrieve and store frequently needed data in a cache memory, not shown. The processor (102) may also include a coprocessor (not shown) as a supplemental processing component to aid the processor and/or memory (110).

A removable mass storage device (112) provides additional data storage capacity for the computer system (100), and is coupled either bi-directionally (read/write) or uni-directionally (read only) to processor (102). For example, storage (112) may also include computer-readable media such as flash memory, portable mass storage devices, holographic storage devices, magnetic devices, magneto-optical devices, optical devices, and other storage devices. A fixed mass storage (120) may also, for example, provide additional data storage capacity. The most common example of mass storage (120) is an eMMC device. In one embodiment, mass storage (120) is a solid-state drive connected by a bus (114). Mass storage (112), (120) generally store additional programming instructions, data, and the like that typically are not in active use by the processor (102). It will be appreciated that the information retained within mass storage (112), (120) may be incorporated, if needed, in standard fashion as part of primary storage (110), for example RAM, as virtual memory.

In addition to providing processor (102) access to storage subsystems, bus (114) can be used to provide access to other subsystems and devices as well. As shown, these can include a display monitor (118), a network interface (116), a keyboard and/or pointing device (104), as well as an auxiliary input/output device (106) interface, a sound card, microphone speakers, and other subsystems as needed. For example, the pointing device (104) can be a mouse, stylus, track ball, touch display, and/or tablet, and is useful for interacting with a graphical user interface.

The communication interface (116) allows processor (102) to be coupled to another computer, computer network, or telecommunications network using a network connection as shown. For example, through the communication interface (116), the processor (102) may receive information, for example data objects or program instructions, from another network, or output information to another network in the course of performing method/process steps. Information, often represented as a sequence of instructions to be executed on a processor, may be received from and outputted to another network. An interface card or similar device and appropriate software implemented by, for example executed/performed on, processor (102) may be used to connect the computer system (100) to an external network and transfer data according to standard protocols. For example, various process embodiments disclosed herein may be executed on processor (102), or may be performed across a network such as the Internet, intranet networks, or local area networks, in conjunction with a remote processor that shares a portion of the processing. Throughout this specification "network" refers to any interconnection between computer components including the Internet, Bluetooth, WiFi, 3G, 4G, 4GLTE, GSM, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, may also be connected to processor (102) through communication interface (116).

In addition, various embodiments disclosed herein further relate to computer storage products with a computer readable medium that includes program code for performing various computer-implemented operations. The computer-readable medium is any data storage device that may store data which may thereafter be read by a computer system. Examples of computer-readable media include, but are not limited to, all the media mentioned above: flash media such as NAND flash, eMMC, SD, compact flash; magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that may be executed using an interpreter.

The computer/server system shown in FIG. 1 is but an example of a computer system suitable for use with the various embodiments disclosed herein. Other computer systems suitable for such use may include additional or fewer subsystems. In addition, bus (114) is illustrative of any interconnection scheme serving to link the subsystems. Other computer architectures having different configurations of subsystems may also be utilized, including virtual servers.

The Insider Attack Surface. The insider attack surface is a sum total of human action, access, attack frequency, and security controls that impact risk to an enterprise. The insider attack surface comprises an understanding that any human of an enterprise may make good or bad decisions that impact security, that the human may have access that increases the "blast radius" of mistakes, and enterprise controls may help mitigate that human risk. Put another way, any human may have strengths and weaknesses, privileges, and security software that have a significant impact on the security of an associated enterprise. As referred to herein, a "blast radius" is a measure of impact of a mistake. For example, a domain administrator or human with high levels of privilege to sensitive information may have an increased blast radius over a student intern.

Evaluating the insider attack surface across all members of an enterprise may be a significant undertaking. Attack vectors may evolve, and beyond this, human decisions may be difficult to understand. Furthermore, humans may have different access levels which may create a multi-dimensional problem. Managing the insider attack surface includes two stages: visibility to gain insights into the risks the enterprise faces from humans; and control to take action in reducing or managing human risk.

The visibility stage helps an enterprise understand where the highest risk humans are in the organization. It may be particular individuals, departments, and/or physical locations, for example. This stage also helps determine the risk they are introducing, for example, account compromise, data loss, and/or ransomware. The control stage helps determine actions to measurably reduce enterprise risk and/or human risk given the visibility on understanding at least in part the riskiest area of the enterprise.

Visibility into the Insider Attack Surface. One longstanding challenge when dealing with the human side of security is a lack of visibility or context to make informed decisions. This may be one reason why the industry has used "awareness and training" in part as a crutch for solving this challenge when no real data is taken. By contrast, the disclosed describe improving visibility into the insider attack surface.

A foundation of visibility into human risk is an important part of insider attack surface management. By contrast, in relying on "awareness and training" information like: Did this specific user take training; Did that specific user answer a quiz correctly; and/or Did this next user fail a simulated phishing test?—none of this "awareness and training" information measures the actual insider attack surface.

Understanding the insider attack surface based at least in part on using existing tools an enterprise has in place is disclosed. Going back to the components in the definition of an insider attack surface, most enterprises may have this data, for example:

People—Directory Services, HR Platforms;
Actions—Email Security Gateways (phishing), Web Gateways (internet browsing), Identity Solutions (password security), Endpoint Protection (malware), Data Loss Prevention tools (data handling);
Frequency of Attack—Email security gateway (phishing), Web Gateways (phishing, malware), Endpoint (malware);
Access—Access Management, Directory Services, Application RBAC; and/or
Security Controls—may be identified using the tools above.

This existing data may be integrated in part to build risk context for a given insider. In one embodiment, a "kill chain analysis" is performed based on an attacker's view of an attack. As referred to herein, a kill chain analysis includes analyzing steps that one or more hypothetical attackers take and how their attack flows between systems. For example, for a given inside, Susie, a risk score may reflect her risky past actions and their impact. A kill chain analysis may include answering questions of:

"How much risk of Account Takeover does Susie represent?" and determining a quantitative measure of 5.2 based at least in part on the enterprise data;
"How much risk of Data Loss does Susie represent?" and determining a quantitative measure of 7.6 based at least in part on the enterprise data;
"How much risk of Ransomware does Susie represent?" and determining a quantitative measure of 8.9 based at least in part on the enterprise data; and
Based on these quantitative measures, determining Susie's risk score to be 7.2.

Context is thus built across existing systems to understand the risks such as account takeover, data loss and ransomware.

Managing the Insider attack surface. With trusted visibility into an individual user's actions, access, and security controls, a fuller picture of human risk is generated. Visibility is useful because an enterprise determines a new understanding of the risks inside itself and where to get started. Visibility may enable further action.

There are several ways to manage an enterprise's insider attack surface, by adding more 'friction' and/or security measures for riskier employees while allowing good behavior to maintain level friction or in some cases reduce friction. Management techniques include:

- Automating personalized and adaptive policy orchestration in tools to add safety nets for higher risk humans;
- Zero trust implementations using risk data around authentication or access decisions;
- Providing real-time feedback to humans on their security performance;
- Providing tooling to analyst functions that approve things such as access or software downloads;
- Automating business workflows based on events, controls or risk thresholds;
- Tailoring software deployments which have higher costs or friction to the most risky humans; and/or
- Security investment assessments to determine efficacy of rollouts and their impacts to humans.

Figure 2A:
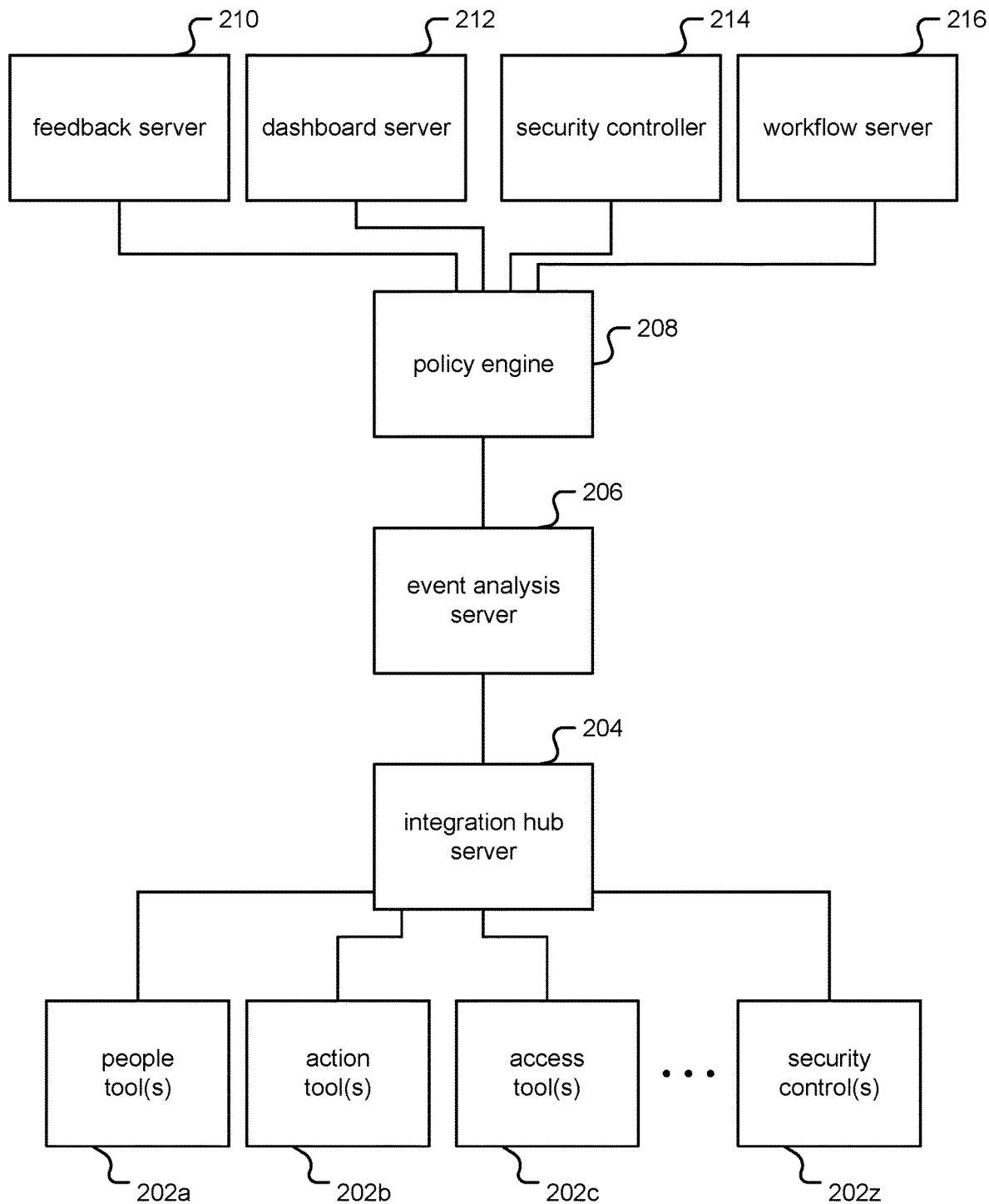
FIG. 2A is a block diagram illustrating an embodiment of a system for determining visibility into human risk.

FIG. 2A is a block diagram illustrating an embodiment of a system for determining visibility into human risk. In one embodiment, the blocks of FIG. 2A may each be represented by one or more computer/systems of FIG. 1 and/or a computer/system of FIG. 1 may service one or more blocks of FIG. 2A.

One or more enterprise tools and/or servers (202a-z) such as one or more people tools (202a), one or more action tools (202b), one or more access tools (202c), and one or more security tools (202z) are coupled to an integration hub server (204). Without limitation the enterprise tools (202a-z) may serve an existing and/or everyday security purpose in an enterprise and are related to the insider attack surface as described herein.

The integration hub server (204) may ingest, normalize, and/or sanitize a range of incident data from existing security technologies and employee data from HR (human resources) sources. The integration hub server (204) may offer a wide and diverse employee security data ecosystem with connectors to popular cybersecurity tools and systems. This is an improvement over traditional methods in that an enterprise may leverage existing security investments to deliver human risk insights without requiring new security systems which may need additional processing, storage, and network resources, as well as additional training and licensing costs.

Additional leverage includes security information already gained on any user's past actions, access privileges, and attack history even if it predates installation of the system of FIG. 2A.

The integration hub server (204) may be where all connectors are built to connect to different security technologies and HR data sources, and may supports both on-premise and cloud data sources. The hub may ingest the data, normalize it, and sanitize it.

The integration hub (204) may pull data from on-premise and cloud based services via a push or pull mechanism through APIs, SFTP, syslog, and other transfer methods. In one embodiment, this data is synced and processed in real-time across actions, access, attack frequency, and control data. Given the breadth of security vendors on the market, normalization of data across different tools may associate this data with different users, systems and locations. Additionally, individual customer integrations may require normalization based on their internal configuration, enhancements and enrichment of data. The integration hub (204) carefully uses different sync mechanisms for a given service, does real-time data retrieval and processing, and provides a bridge for new/existing vendors with an appropriate abstraction level for interoperability.

Example security data types ingested by an integration hub server (204) comprise:

- People—from directory services, HR, identity, and access management solutions;
- Access—from access management and directory services;
- Actions
  - Real World Phishing—from email gateways;
  - Malware—from endpoint protection, email/web gateways, and firewalls;
  - Internet Browsing—from web gateways;
  - Sensitive Data Handling—from DLP for networks, endpoints, and email;
  - Identity Security—from identity and access management solutions;
  - Device Security—from endpoint management solutions;
  - Physical Security—by manual collection;
  - Phishing Simulation test results; and/or
  - Security Awareness Training logs; and/or
- Security Controls—from any data sources;

The integration hub server (204) is coupled to an event analysis server (206), for example, a security risk analysis and context analyzer (206). The server (206) takes the integrated stream of enterprise tool (202a-z) data such as logs or telemetry to determine visibility into human risk. In one embodiment, a user-specific risk score, analogous to a FICO (Fair Isaac Corporation) credit score, is generated by the event analysis server (206) based on enterprise tool (202a-z) data.

A security events analyzer (206) uses data from the integration hub server (204) to score and create human risk scores for a plurality of employees, and then passes it on with context to other modules shown above events analyzer (206) in FIG. 2A. In one embodiment, the security events analyzer (206) constructs a model of an enterprise's insider attack surface. The model provides visibility into individual humans as well as the enterprise at large.

In one embodiment, three types of ratings data are used to evaluate both current and historical performance, then combined to produce a human risk score:

- Security Actions Rating: How are humans doing in day-to-day decisions that they are making?
- Security Access Rating: How is access being managed? Is the blast radius reduced over time?
- Security Attack Frequency Rating: How frequently are insiders being attacked? Are there cohorts more attacked than others? and/or
- Security Control Score: Are configuration and controls in the enterprise holding up against attack?

Examples of human actions that may be judged in the events analyzer (206) include:

- storing passwords outside a password manager;
- visiting an inappropriate site;
- clicking on an email link from a questionable sender;
- how frequently an individual receives malicious emails or file downloads;
- clicking on ad bait;
- uploading confidential documents to a (public) cloud/other network;
- downloading malware or falling for a ransomware attack;
- using a weak password; and/or sending files from a user's business email to the user's personal email.

In one embodiment, a human risk score is a quantifiable measure of an individual humans's risk level. An advantage of a human risk score is that it is robust, trusted, proactive, and predictive, and may alert an enterprise to risks before mistakes happen. By focusing prevention efforts on riskier humans in an enterprise and relaxing security controls for those that are less risky, friction is reduced throughout the organization and attitude towards security is improved. Similar to a FICO credit score, human risk scores fluctuate based on activity. Trended over time, they may additionally help security teams gain an objective view into a human, team, and/or department's improved or degraded risk level.

For example, an event log for a given human that may be analyzed by security events analyzer (206) is as follows:

| LAST ACTION TAKEN | DECISION OR EVENT | IMPACT TO RISK LEVEL | SEVERITY | DATA SOURCE |
|---|---|---|---|---|
| Jan. 25, 2021 4:00 pm PST | Reported on a phishing simulation | ⊕ Positive | N/A | Proofpoint |
| Jan. 16, 2021 4:00 pm PST | Password Manager is installed but not active | ⊖⊖ Negative | N/A | LastPass |
| Nov. 20, 2020 4:00 pm PST | Phishing delivered, clicked | ⊖⊖ Highly Negative | Critical | Proofpoint |
| Aug. 11, 2020 5:00 pm PST | Secure Browsing Block Continue Gambling Site | ⊖ Negative | High | Zscaler |
| Aug. 6, 2020 5:00 pm PST | Compromised on a phishing simulation | ⊖ Negative | Moderate | Cofense |
| May 28, 2020 5:00 pm PST | Compromised on a phishing simulation | ⊖ Negative | Moderate | Cofense |
| May 11, 2020 5:00 pm PST | Malware Download, Execution | ⊖⊖ Highly Negative | Critical | Crowdstrike |
| Mar. 2, 2020 4:00 pm PST | Compromised on a phishing simulation | ⊖ Negative | Moderate | Cofense |
| Jan. 22, 2020 4:00 pm PST | Reported on a phishing simulation | ⊕ Positive | N/A | Proofpoint |

In this example, security events are received from a web gateway (Zscaler), email gateway (Proofpoint), endpoint (Crowdstrike), Password Manager (LastPass), and a phishing simulation product (Cofense). The events are analyzed as received and contribute both positively and negatively to scores. As shown, there are a string of negative events that include a high severity block from the web gateway and clicks on actual phishing attacks reported by the email gateway. Also, as of Jan. 16, 2021 this individual has LastPass installed, but they have not been using it regularly and have points deducted for that.

In one embodiment, events that are indicative of the security decisions people make are termed "Action Factors". Many actions have a lasting impact on a human risk score, for example up to two years. The effect of a good or bad security action becomes less impactful on one's score the farther away they are from it. For example, if an employee were compromised on a phishing test in December, this may make their 100-point phishing score drop to 50 points. Then in each month after December, their score slowly rises and eventually, if they do not have an incident, go back up to a perfect phishing score of 100 points.

There are other events in this example log that are not actions, but indicate how much a person is being targeted by attackers. These include how many phishing emails the email gateway has blocked and how many malware executions the endpoint protection software has prevented. In one embodiment, these events are termed "Attack Factors."

Besides events, states like policy group memberships and hierarchy levels are also considered by events analysis server (206). These states may be indicative of how much privileged access or control that a human has. These states may be received from LDAP policy groups, privileged access tools or derived from HR files and used to calculate a blast radius for a human if they were phished or malware was installed on their endpoints. In one embodiment, these states inform what is termed "Access Factors" which answer the question "what is the potential impact of this person's account being compromised?"

Traditionally, the events in this log may not individually rise to the level of an intervention from a security team and the policies for a web gateway, email gateway, and password manager are unlikely to be aware of each other. But using the system of FIG. 2A, they are brought together to enhance visibility into a broader scope of risk.

The security events analyzer (206) such as a risk analysis and context analyzer (206) may also publish and/or make one or more human risk scores available as a service, such as a security reputation service. In one embodiment, an API (Application Programming Interface) may be used to feed such scores into third-party systems, such as ServiceNow. As an improvement, human risk scores may support (Information Technology) IT helpdesk workflows around granting access levels or authorizations.

In one embodiment, the risk/policy orchestration and automation engine (208) is intelligent and scalable, and offers a deep choice of security controls, including automated interventions. It may target and manage interventions and communications based on policy controls, identity/ access, and/or activity monitoring. These actions may be aimed at specific risks or threats—such as ransomware, account compromise, and/or sensitive data theft.

Event analysis server (206) is coupled to a policy engine (208), for example, a policy orchestration and automation engine (208). The engine (208) may orchestrate policy and decide which systems to control, for whom, and at what level. The engine (208) may help manage an enterprise's insider attack surface by communicating with the management modules including a feedback server (210), a dashboard server (212), a security controller (214), and/or a workflow server (216).

In one embodiment, the risk engine (208) has built-in capabilities to orchestrate decisions and workflows based on specific events, scores, thresholds, and/or other metadata available to the engine. This automation may be performed at an individual, team, department, organization or cohort level based on data derived from the system. Once triggered, this automation may build complex workflows based on an insider's risk. For example, for a group of individuals at high risk of data loss—the engine may orchestrate communicating that risk to people, add additional technology and auditing to better protect and monitor them, inject additional workflow such as two-factor authentication ("2FA") or manager approval on high risk actions, and adaptively update based on changes in risk.

The feedback server (210) such as a feedback module handles communication to individual humans based on data received from the risk/policy orchestration and automation engine (208). In one embodiment, the feedback server (210) explains to humans why certain controls and access levels have changed, how frequently they are being attacked, and how their actions impact their security experience, either in a positive or negative manner.

Communications sent by the feedback module (210) may be proactive and personalized to the individual, according to their appropriate level such as staff, managers, or executives, and specific to the risk, for example, phishing, malware, data handling, and/or password security. In addition security teams may create feedback rules utilizing the policy engine based on changes in score, changes in control states such as no longer utilizing file encryption or a combination of factors such as individuals with Macbook Pro laptops, who are developers in Asia, who are attacked frequently.

An example message from the feedback module (210) states "(!) Password Manager. We recommend installing Lastpass as soon as possible to strengthen access to your accounts. Your CEO John Doe uses Lastpass, too! 50% of your department has install Lastpass. (X) Password manager is not installed." and includes a widget to install a password manager such as the one recommended in the messages, Lastpass. As seen in the example, dynamic education/information such as a notable human such as the CEO and/or group statistics such as department installs may be used to encourage a human to improve their own security.

Reducing the insider attack surface using proactive communication to risky employees on their security performance and actions is an improvement of the feedback module (210). Such a simple action may reduce work-arounds and organizational friction often caused by security restrictions. It may also reduce an over-reliance on training to solve the problem. Frequently targeted individuals may be told to stay vigilant, with tips on how to keep the organization secure. Those humans making poor decisions may receive direct feedback in real-time to improve decision making. Managers and/or department heads may receive scorecards around known risks and what they can do to help their teams. Executives and/or leadership may receive reports on security efficacy and how human risk is being mitigated over time.

A dashboard server (212) such as a benchmarks dashboard is a control station for administrators, managers, and/or users to monitor the insider attack surface and measure how it evolves over time. In one embodiment, a dashboard (212) provides at-a-glance visibility including visualization into the insider attack surface for easy risk analysis, for example, using one or more human risk scores and/or an "enterprise risk score" based on one or more human risk scores. Metrics may be visualized either internally across users, departments and regions and/or externally comparing peer groups by industry, size, and/or maturity.

In one embodiment, evaluation of an enterprise's security posture against industry peers and benchmark progress is available with a dashboard server (212) such as a benchmarks dashboard. An enterprise may benchmark against peers in the industry. Departments may benchmark against another to determine the riskiest employees and groups to target and remediate. Human risk score reports may be used as risk factor inputs into relevant industry-standard frameworks such as NIST. Peer-level benchmarking may be used as a way to calibrate security posture and report to enterprise stakeholders on progress. Providing better visibility into the insider attack surface enables improvement of the efficacy of existing security tool investments, quantifying ROI, optimizing budgets, and better assess investments in the future.

In one embodiment, dashboard (212) reports are customizable, flexible, easily understandable, and ready for executive-level reporting, and are actionable. A dashboard (212) may be configurable such that stakeholders may nearly-instantly understand who the riskiest humans are and how the enterprise is performing compared to its peers.

A security controller (214) such as a tailored security controls module takes instructions from the policy engine (208) and pushes risk-appropriate policy changes out to any security systems and/or tools (202a-z) that need updating. It may ensure that the enterprise insider attack surface management efforts are synchronized with an enterprise's existing security stack, focusing on specific risks and risky humans.

Similar to the integration hub server (204), the tailored security controls module (214) may have a wide and diverse employee security data ecosystem, including output connectors to existing/popular security tools and systems. The security controller (214) may automatically update other security systems such as IAM, email security, web gateways, DLP, and/or endpoints.

Tailored security, such as that associated with the security controller (214), is referred to herein as a process of optimizing controls on individuals based on how much risk they present to the insider attack surface. Instead of "one-size-fits-all" lockdowns, individual controls are set based on a human's past actions, level of access, and how frequently they are targeted. The tailored security controls module (214) may support the following functions:

SOC and Incident Response team that detects and remediates hacks and/or attacks;

Help Desk staff that evaluates and approves human actions that impact security;

Security Engineering who may determine policies, technology, and/or auditing to put in place; and/or Security Analysts who determine whether access privileges should be changed or granted.

Thus, tailored security and insider attack surface management may provide valuable insight for decision makers across an enterprise to make educated and defensible security decisions.

In one embodiment, policy updates are pushed automatically to existing security systems. This reduces "nagging," extraneous controls and technology, unnecessary logging and auditing, and/or ineffective security training that creates enterprise friction and slows down performance. This may proactively prevent ransomware, malware, IP theft, or account compromise before it happens.

Orchestrating risk-appropriate policy updates and deciding which systems to control, for whom, and at what level is disclosed. The security controller (214) or other server in FIG. 2A may automatically update existing security tools and systems via direct integration with IAM, email security, DLP, web gateways, endpoints, and/or any component or any combination of components of a complete security stack.

A workflow server (216) takes instruction from a policy engine (208) such as a risk/policy orchestration and automation engine (208), to determine and/or generate business rules to manage feedback of risk to other systems through automation. The workflow server (216) may be used to trigger proactive workflows with humans for an enterprise, for example users, managers, and security teams.

Figure 2B:
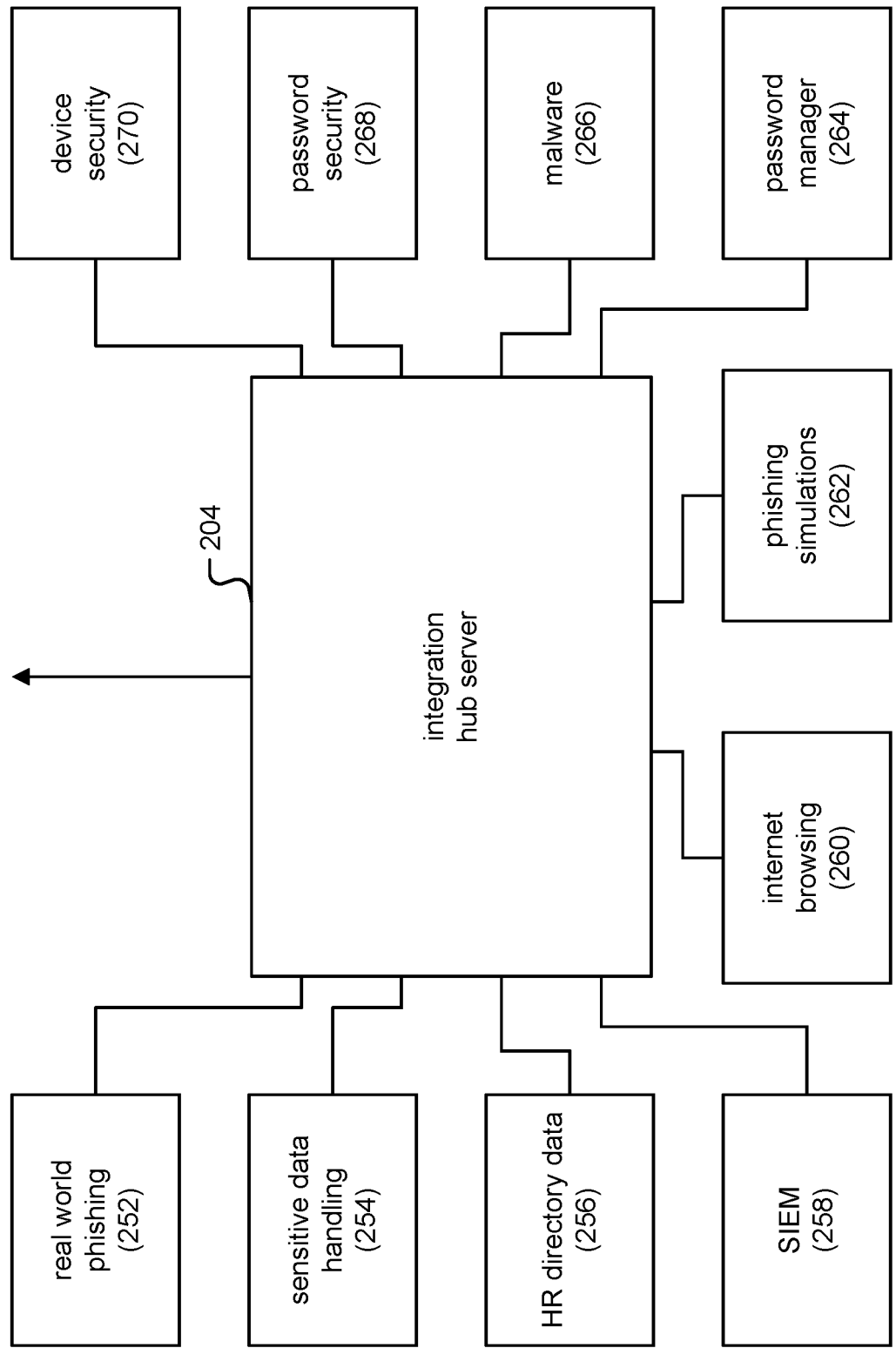
FIG. 2B is a block diagram illustrating an embodiment of a system for integrating security data sources.

FIG. 2B is a block diagram illustrating an embodiment of a system for integrating security data sources. In one embodiment, the blocks of FIG. 2B may each be represented by one or more computer/systems of FIG. 1 and/or a computer/system of FIG. 1 may service one or more blocks of FIG. 2B. In one embodiment, the integration hub server (204) of FIG. 2B is the integration hub server (204) of FIG. 2A.

As described above, an insider attack surface is a sum total of insider actions, access, attack frequency, and security controls that impact an organization's risk. Thus, security data sources associated with people, access, and security controls are ingested, normalized, and/or sanitized as part of the integration hub server (204).

People Security Data Sources. It has been said that humans within an enterprise are attributed to at least two-thirds of all security incidents. These humans that make up an enterprise are varied, from full time employees to contractors to seasonal workers to interns to third party vendors, and have different aptitudes and attitudes towards enterprise and personal security. Understanding humans is useful to understanding the insider attack surface as opposed to traditional security techniques, and may be used as a core to pivot other security data sources off of. Examples of people data sources include directory services, human resource services, identity management solutions, and/or access management solutions.

Directory services, HR platforms, and IAM products (256) that are already in use at an enterprise may already have data to begin building profiles around humans associated with the enterprise. Information may include: detailed employee info such as name, email, start date; departments; manager hierarchy; location; and title/roles.

Integrating people security data source information efficiently is disclosed. Building connections around humans and their actions, access, attack frequency, and controls comprises pulling information to gain understanding of the risks associated with them. For a given enterprise, analysis of this understanding is designed to answer:

What would the enterprise like to gain visibility into through dashboards and reporting?
Can we predictively identify future risks?
What would the enterprise like to take action on? What data do I need to automate those decisions?

Examples of current vendors from which people security data sources may be pulled include: Microsoft Azure, Workday, and/or Okta.

Action Security Data Sources. Understanding actions a human takes may be useful to getting visibility into the insider attack surface. Humans in an enterprise make decisions frequently, from what websites they browse to emails opened to choosing passwords. The list of actions humans take that have security implications and their business impact is significant. Pulling action context together is disclosed. By pulling context, good and bad decisions may be processed, and their impact on how a decision helps or inhibits the security of an enterprise may be made visible.

A system as described in FIG. 2A consumes actions with an understanding of an attacker's kill chain. This allows the system to build context between actions and tie data across disparate systems back to a historical view of, and understanding of, ensuing steps insiders have taken. For example, an account compromise risk spans data and context from a directory service, email security gateway, web gateway, endpoint, and IAM solution.

Examples of action data sources include real world phishing actions, malware actions, internet browsing actions, sensitive data handling actions, identity security actions, device security actions, physical security actions, phishing simulation test results, and security awareness training logs.

Actions may be described in several categories of data and technology systems, most of which tend to be available in enterprises:

Real World Phishing (252);
Security Information and/or Event Management (258);
Malware (266);
Internet Browsing (260);
Sensitive Data Handling (254);
Password Management (264);
Identity and/or Password Security (268);
Device Security (270);
Physical Security (not shown in FIG. 2B);
Phishing Simulation (262); and/or
Training (not shown in FIG. 2B).

Real World Phishing. Real world phishing (252) is the collection of data around a human's email security decisions: Do they receive many phishing emails? Click bad links? Download attachments? Report security issues? Determining an understanding of human actions here gains visibility into email security risks in an enterprise. Analysis of this understanding is designed to answer:

Which humans are the most attacked?
Who clicks on phishing links frequently?
Which groups are an enterprise's best champions around reporting issues?

These security data sources may be made available in email security gateways and email providers. Examples of current vendors from which action security data sources may be pulled include: Proofpoint, Office 365, and/or Google Workspace.

Malware. Malware (266) is the detection, download, or execution of malicious code. These tend to be high impact incidents, but with improvements in endpoint and other software, may happen less frequently. Determining an understanding of human actions and subsequent analysis is designed to answer:

What departments in an enterprise most frequently download malware?

Who are the highest risk individuals in an enterprise that are being targeted by malware?

Are there parts of the organization that need further protection because of their risk?

Malware security data sources may typically be found in endpoint protection and detection software, but also may be found in email security gateways, web security gateways, and firewalls. Examples of current vendors from which action security data sources may be pulled include: Crowdstrike, Carbon Black, and/or Sentinel One.

Internet Browsing. Internet browsing (260) of humans in an organization gives insights into their website browsing habits. Determining an understanding of human browsing patterns and subsequent analysis is designed to answer:

Which humans have the riskiest browsing habits?

What is their patterns of browsing that is unique to them?

Are some parts of an enterprise routinely navigating to nefarious websites?

Are there certain groups in an enterprise that are more frequently falling for phishing or malicious code download attempts hosted on these sites?

Internet browsing security data sources may be typically found in web security gateway solutions. Examples of current vendors from which action security data sources may be pulled include: Zscaler, Netskope, and/or Symantec.

Sensitive Data Handling. Sensitive data handling (254) and/or mishandling occurs when a human mishandles enterprise sensitive data by inappropriately sharing or exposing sensitive information. This may be malicious, negligent, or unintentional. Determining sensitive data handling and subsequent analysis is designed to answer:

Who is accessing sensitive information? How frequently? How are they handling it?

For example, given a finance department has access to particularly sensitive data, how are they doing?

For example, does an engineering department need more explanation about the enterprise's data handling policies?

This security data source is typically found in data loss prevention platforms and/or products that support data loss prevention directly, which may be found in networking, endpoint, and email security tooling. Examples of current vendors from which action security data sources may be pulled include: Digital Guardian, Symantec, and/or Office 365.

Identity Security. Identity/password security (268) is a combination of information built up through password security decisions. This may be the choice of MFA (multi-factor authentication) used, identification of password reuse, password complexity, and/or usage of other password security tooling, such as a password manager. Determining identity security and subsequent analysis is designed to answer:

For example, do the engineers, which have high levels of access to production environments, utilize good password security decisions?

Can the specific humans be identified who are most at risk for account compromise?

Identity security data sources may usually be found in IAM and related services. Examples of current vendors from which action security data sources may be pulled include: Microsoft Azure, Duo, and/or Okta.

Device Security. The device security (270) category combines configurations and data about the security posture of systems used and controlled by an enterprise's end users. These options may be broad, ranging from password security options to disk encryption to patching speed. Determining device security and subsequent analysis is designed to answer:

For example, is the marketing department frequently dismissing patch warnings?

Are there specific individuals in this enterprise who are disabling security settings because administrative access is given to them or their machines?

Device security data sources may usually be found in endpoint management tooling. Examples of current vendors from which action security data sources may be pulled include: VMWare, Airwatch, MobileIron, and/or Jamf.

Physical Security. Physical security issues may span many different domains, but include anything from tailgating into an office to lost laptops to having a clean desk free of sensitive data to travel to high risk countries. Determining physical security and subsequent analysis is designed to answer:

For example, are new interns to the enterprise following rules on its tailgating office policy?

For example, is the sales team losing laptops when they go out for after hour drinks?

Because this category spans in and out of cyber security, security data sources are often manually collected. For example, there may not exist an automated tool to determine if a human is violating a clean desk policy. Depending on the use case, there may be some physical security source data found in other enterprise security tools.

Phishing Simulation. Phishing simulations (262) exist to test a human's ability to spot phishing emails. These tools evaluate whether a human opens phishing emails, clicks on links, enters credentials into a fake website and more. Determining phishing simulation data and subsequent analysis is designed to answer:

Are humans in the enterprise reporting suspicious emails appropriately?

For example, is a Japanese subsidiary more likely to fall for simulated phishing than other subsidiaries?

Examples of current vendors from which action security data sources may be pulled include: Cofense, Proofpoint, and/or Microsoft.

Training. The training category assesses completion of assigned security training. Determining training data and subsequent analysis is designed to answer:

Is training making any difference at all in reducing the poor decisions humans in this enterprise make?

Examples of current vendors, including those labeled as security awareness and training, from which action security data sources may be pulled include: KnowBe4, Proofpoint, and/or HabitU8.

Access Security Data Sources. Understanding access levels is useful to gaining insights into the impact of a potential poor decision a human in an enterprise makes. As referred to herein, this is the 'blast radius' of something bad happening. For example, a system administrator of an enterprise may download malware, wherein the impact is significant given the access levels that they have. By contrast, a manufacturing worker with limited access beyond email on a locked down device may have a much lower blast radius impact. Examples of access data sources include access management solutions and directory services.

Determining visibility into access gains the ability to understand the risk equation for a particular human in an enterprise:

$$Risk = Impact \times Likelihood$$

Within an access framework, this may be expressed as:

Risk=Access×Historical Actions,Attack Frequency, Controls

This analysis produces a view into a human's true risk to an enterprise at any given time.

Actions Factor. An important factor in determining the relative risk of a human is understanding the kinds of security actions they take second by second as they perform their jobs. What kind of decisions do they make when they use email, browse the web, and/or share information? How have they set up their devices? Do they do their training on time? This data may just be noise without proper experience. Turning this event data into a valuable summary of how people are contributing to an overall security posture is disclosed.

Actions may be placed into a plurality of categories, for example fourteen categories:

| Category Name | Example Sources | Example Events |
|---|---|---|
| 1. Actual Phishing | Email Gateways (Google Workplace, Microsoft Defender ATP, Proofpoint) | Clicked on known phishing email<br>Reported phishing email<br>Clicked on known spam |
| 2. Phishing Simulation | Phishing Simulation Products (Cofense, KnowBe4) | Clicked on a phishing simulation<br>posted credentials in a phishing simulation<br>reported a phishing simulation |
| 3. Sensitive Data Handling | Data Loss and Prevention Products (Microsoft Defender ATP, Digital Guardian) | High, medium, low data loss events |
| 4. MFA | MFA Providers (Okta, Microsoft AzureAD) | MFA enabled (or not) for SSO<br>MFA-type used |
| 5. Password Manager | Password Managers (LastPass, 1Password) | Has password manager<br>Uses password manager<br>MFA-enabled on Password manager |
| 6. Secure Browsing | Web Gateways (ZScaler, Palo Alto Networks) | URL blocked (with severity level, categorization)<br>If shown risk, confirmed risk and continued browsing |
| 7. Malware | Endpoint Protection Software (Crowdstrike, VMWare Carbon Black), Antivirus (Mcafee) | Malware downloaded<br>Malware executed<br>Malware blocked |
| 8. Device Security | Endpoint or Mobile Device Management (JAMF, VMWare Workspace One) | Encryption Enabled<br>Patching Compliance |
| 9. Physical Security | Badging Systems; Case Management | Policy Violation with severity levels<br>Lost/Stolen Property |
| 10. Clean Desk | Manual Assessments | locked property left at desk<br>non-public info exposed |
| 11. Training | Training and LMS (KnowBe4, Habitu8) | Training completed on time<br>Training completed late |
| 12. Optional Activities | Manual Assessments | Completed optional training activities not assigned |
| 13. Password Strength | Password Managers (LastPass, 1Password), Haveibeenpwned | Strong v. weak password<br>non-unique passwords<br>password has been compromised |
| 14. Unauthorized Software | Endpoint or Mobile Device Management (JAMF, Tanium) | Unauthorized software policy violation (by severity level) |

As shown in the above example with the event log, some events are positive like reporting a phishing email, some events are negative like executing malware, and either may have a corresponding impact on the Actions Factor. How positively and how negatively these events are scored is configurable. When an individual is new, there is no historical data on which to calculate category scores so defaults may be relied upon that change as events come into the platform. These defaults are also configurable.

FIG. 2C is an example screenshot of how phishing events may be scored. FIG. 2D is an example screenshot of how secure browsing events may be scored. FIG. 2E is an example screenshot of how password manager events may be scored. The scores and weights for these categories, and default weights, may be configured with the integration hub server (204) during onboarding.

Once such events are analyzed, every human in an enterprise may have a score for every action category. These "category scores" may have a minimum of 0 and a maximum of 100, where higher is less human risk. Category scores may answer the question, "how good is this human at making security decisions in this category?"

| Example of category scores | |
|---|---|
| What's the range? | 0-100 |
| What does it tell? | "How good is this human at making security decisions in this category?" |
| How is it calculated? | Points gained and lost based on severity of events. |
| What's it used for? | Generating composite Risk Insights and Human Risk Score<br>Generating feedback Category Blocks<br>Generating dashboard<br>Reputation Service API<br>Key Insights<br>Repeat Performers<br>Riskiest Groups<br>Driving policy engine decisions |

Humans new to the enterprise, for example new hires, may have null scores for some categories. Two examples of this are if they did not participate in a security training held last year, which may result in a null training score; or they have not received a phishing simulation resulting in a null phishing score. New hire status is determined by the 'start date' field that is ingested via the organization/HR data source. If data exists prior to the start date, it may be utilized for scoring.

In one embodiment, for each human the scores of all their action categories are combined to create a "performance rating". For example, a weighted average may be used, wherein the weights are configurable. One reason to use a weighted average to combine category scores is because some categories are higher stakes than others. For example making bad decisions regarding malware may more directly lead to worse outcomes than taking a training course late. One purpose of the performance rating is to give feedback to managers and executives on how their teams are doing.

Some enterprise administrators may change the weights on these action categories in order to emphasize certain behaviors over others in coordination with security awareness campaigns. An example may be to weight phishing reporting higher to coordinate with an awareness campaign about reporting phishing emails, or weighting 2FA-types higher to coordinate with a switch from SMS (simple messaging service) to time-based one-time password (TOTP) multi-factor authentication (MFA) tokens.

In one embodiment, to enhance the motivation potential of the performance rating, use quantiles with names like "sturdy" and "indestructible" are used. To minimize distractions for users/humans of an enterprise, quantile levels are recommended as it has been shown to be far more effective at encouraging behavior change and reducing the inbound questions to the security team about "why is my score 82 instead of 83?" Configuration by administrators allows exposing a 0-100 score to humans, or simply exposing five levels/quantiles:

| Example of performance rating | |
| --- | --- |
| What's the range? | 0-100 |
| | Displayed as quantiles: |
| | Flimsy (0-20) |
| | Tenuous (21-40) |
| | Sturdy (41-60) |
| | Fortified (61-80) |
| | Indestructible (81-100) |
| What does it tell? | "How good is this human at making security decisions overall?" |
| How is it calculated? | Points gained and lost based on severity of events. |
| What's it used for? | The overall rating in feedback Email Campaigns Dashboard |
| | Reputation Service API |
| | Individual Reporting Pages |
| | Key Insights |
| | Repeat Performers |
| | Riskiest Groups |
| | Driving policy engine decisions |

Attacked Factor. If the actions factor may be thought of as "how well a human makes security decisions", then the attacked factor may be thought of as "how often does the human have to make security decisions?" If two humans have the same action category scores, but Human A gets 100× more phishing emails than Human B, then Human A represents more of the total risk than Human B. In order to calculate the attacked factor, data from the email gateway, endpoint protection software, and web gateway events may be used.

In one embodiment, a single attacked factor—the overall attacked factor—is used in human risk calculations. Alternately, a plurality of attacked factors may be used based at least in part on correlations between types of attacks and types of risk. The overall attacked factor comprises how many actual phishing emails were delivered since the beginning of data collection and how many malware events have occurred. For the purpose of calculating other scores, the calculation may be normalized onto a scale, for example from 0-10 where 10 is the most attacked. This data may be shown on an individual reporting display as quantiles (Very Low→Critical) and/or show events that lead to this calculation.

For example, an individual reporting display for human "Amy" may state: "How attacked is this individual? Medium Attacked Level: Relative to others in your enterprise, Amy is a medium targeted and attacked individual. During Amy's 6-month tenure, this human has received 15 phishing emails and was involved in 6 malware incidents. Amy is on average, 5% more attacked than other individuals in the enterprise."

| Examples of an attacked factor | |
| --- | --- |
| What's the range? | 0-10 |
| | Displayed as quantiles: |
| | Very Low (0-2) |
| | Low (3-4) |
| | Medium (5-6) |
| | High (7-8) |
| | Very High (9-10) |
| What does it tell? | "How often is this human attacked?" |
| How is it calculated? | Accumulation of all phishing attacks and malware incidents, normalized. |
| What's it used for? | Generating composite Risk Insights and Human Risk Score |
| | Individual Reporting Pages |
| | Risk Analysis Page |
| | Reputation Service API |
| | Driving policy engine decisions |

Access Factor. Any calculation of human risk may be enhanced with a concept of what is at stake. To do this, data about access is used to answer the question, "If this human was compromised, how bad would it be?" or "What is the blast radius?" If two humans have the same Security Rating, but Human A has access to more systems than Human B, then Human A represents more of the total human risk than Human B.

In order to calculate the access factor, data about an individual's place in the organizational hierarchy, their role, and access groups imported from other tools is used. In one embodiment, each data point is rated on a scale, for example a scale of 0-5 where 5 is the most privilege.

In one embodiment, a single access factor—the overall access factor—may be used in human risk calculations as a weighted average of all the access data points. Alternately, a plurality of access factors may be used based at least in part on correlations between types of access and types of risk. This data may be shown on an individual reporting page as quantiles (Very Low→Critical). The access groups an individual is in may also be shown. For the purpose of calculating other scores, the calculation may be normalized, for example onto a 0-10 scale where 10 is the most access.

For example, an individual reporting display for human "Amy" may state: "What access does Amy have? ! High Access Level: Relative to others in the enterprise, Amy has a high level of access and privileges. Access is based on Amy's role, group affiliations, and $3^{rd}$ party privileges, including the following notable privileges: Amy has admin user access on AWS; Amy has App Admin access on Okta; and Amy has a power user role on Splunk."

| Example of access factor | |
| --- | --- |
| What's the range? | 0-10 |
| | Displayed as quantiles: |
| | Very Low (0-2) |
| | Low (3-4) |
| | Medium (5-6) |
| | High (7-8) |
| | Very High (9-10) |
| What does it tell? | "If this human was compromised, how bad would it be?" |
| How is it calculated? | Weighted average of all access data points, normalized. |
| What's it used for? | Generating composite Risk Insights and Human Risk Score |
| | Individual Reporting Pages |
| | Risk Analysis Page |
| | Reputation Service API |
| | Driving policy engine decisions |

Risk Insights. With the actions factor, attacked factor and access factor calculated, the system may begin determining the risk that a human may be involved in different kinds of breaches. For example, feedback may provide insights on the following risks:

Account Compromise: Scored 8.5 based on 17 decisions
Security Knowledge: Scored 3.8 based on 2 decisions
Data Loss: Scored 4.5 based on 4 decisions
Availability Impact: Scored 2.3 based on 3 decisions
Malware: Scored 6.6 based on 10 decisions
Physical Risk: Scored 4.9 based on 1 decision
Privacy Violation: scored 8.7 based on 13 decisions In one embodiment, risk insights are a composite score, calculated from underlying categories, weighted according to their importance in the kill chain of an attacker, and the overall attacked and access factors.

For example, risk insights may include:

| Risk Insight | Risk of | Included Categories |
|---|---|---|
| Account Compromise | An account being taken over by an attacker | Actual Phishing Secure Browsing MFA Password Manager Unauthorized Software Device Security |
| Data Loss | Exposing an enterprise's intellectual property | Sensitive Data Handling Actual Phishing Secure Browsing Unauthorized Software Physical Security Clean Desk |
| Malware | Executing malware on an endpoint | Malware Actual Phishing Secure Browsing Device Security |
| Availability Impact | Being involved in a service outage | Actual Phishing Secure Browsing Unauthorized Software Device Security Physical Security |
| Privacy Violation | Exposing privileged data like credit card numbers | Sensitive Data Handling Secure Browsing Unauthorized Software Device Security Malware |
| Physical Risk | Letting an enterprise's property slip into an attacker's hands | Physical Security Clean Desk |
| Security Knowledge | Failing awareness compliance standards | Phishing Simulation Training Optional Activities |

In one embodiment, these connections are made more clear in a revised event log. FIG. 2F is an example screenshot of connections. The screenshot in FIG. 2F includes confidence metrics on the accuracy of a given insight given the category data that has been uploaded.

Example of account compromise risk insight calculation. The likelihood of an account compromise may be thought of as, "Who in the enterprise is most likely to perform actions that may lead to their account being taken over?" For this risk, the categories most likely to be involved in the kill chain of an account compromise are weighted higher and those that are unlikely to be involved are deprecated. For example, since phishing is the most likely attack vector for an account takeover, phishing simulation events are isolated from the training component and weighted higher as real world phishing data. The default weights for all the risk insights are configurable.

| Action Component | Weight |
|---|---|
| Actual Phishing | 10 |
| MFA | 5 |
| Secure Browsing | 5 |
| Password Manager | 3 |
| Unauthorized Software | 3 |
| Device Security | 2 |

Using these example weights, the score for a specific risk insight may be calculated on a scale, for example a scale of 1-100, inverted by subtracting it from 100 and dividing it by 10 to get an actions factor for a given risk insight. A weighted average of the actions factor, attacked factor, and access factor may be used to get a risk insight score for account compromise. The weights in the weighted average for risk insights are configurable and may be used for probabilistic scoring.

| Example of risk insights | |
|---|---|
| What's the range? | 0-10.0 |
| What does it tell? | "What is the amount of risk of this X thing happening does this human Y represent" |
| How is it calculated? | Weighted average of Actions Categories, Attacked Factor, Access Factor (weights and included categories different per insight) |
| What's it used for? | Generating composite Human Risk Score Dashboards and Benchmarks Individual Reporting Pages Risk Analysis Pages Driving Policy Engine decisions |

The Human Risk Score. The human risk score attempts to answer the question "how much risk does this human represent to the enterprise at this moment?" This is answered in at least two ways, by answering "what is the risk of anything happening?", and "what are the risks the enterprise believes are most damaging?" A combination such as a weighted average may be used of one or more risk insights.

Weighted averages may be used because risks differ in importance for different enterprises. One organization may prioritize ransomware over all others, while another enterprise might be worried most about phishing. Using weights allows each enterprise to configure the human risk scoring better suited for the particular environment, and to make recommendations on the weights per industry.

| Example of human risk score | |
|---|---|
| What's the range? | 0-10.0 |
| What does it tell? | "How much risk does this human represent to the enterprise at this moment?" |
| How is it calculated? | Weighted average of Actions Categories, Attacked Factor, Access Factor |
| What's it used for? | Benchmarking and Dashboards Individual Reporting Pages Risk Analysis Page Reputation Service API Driving Policy Engine decisions |

Scoring Groups of Individuals. Beyond the human risk score of a particular human in an enterprise, risk may be summarized for any given group of humans within the enterprise, for example using simple arithmetic averages.

Arithmetic averages may be a simple and intuitive way to combine scores for groups of people, and may help explain scores to others. In one embodiment, a score that refers to a group of individuals is calculated as the arithmetic average of those individuals' scores. Here are some examples:

| | |
|---|---|
| Departmental Human Risk Score | Average Human Risk Score for all the individuals in a department. |
| Risk of Account Compromise for APAC | Average Account Compromise Risk Insight score for all the individuals in the APAC region |
| Team Performance Rating | Average Performance Rating for all the individuals on a team. |

Access data may be pulled from two types of sources-either access management or directory service tools directly by pulling information on group membership, roles, or by inferring access from other types of metadata available on humans, for example roles, or hierarchy. Examples of current vendors from which access security data sources may be pulled include: Microsoft Azure, SailPoint, and/or Okta.

Security Controls. Security controls are the innate products, configuration, and/or protection in place for a given enterprise. These controls may improve the security posture, or the lack of these controls may lessen it. For example, URL sandboxing in email security gateways helps to determine the safety of websites before the user browses to them.

Examples of security data sources include an email security gateway solution, a data loss prevention solution, a web gateway or proxy solution, a firewall solution, a phishing simulation solution, an endpoint protection or detection solution, an endpoint management solution, a password manager solution, a real world phishing solution, a sensitive data handling solution, a human resources directory data solution, a security information management solution, a security event management solution, an internet browsing solution, a device security solution, a password security solution, and/or a malware solution. Other examples of security data sources include an identity management solution, a user directory, an active directory, an access management solution, an email gateway, a phishing solution, an endpoint detection, a virus detection solution, a malware detection solution, a web gateway, a firewall, a non-work site visit detector, a known security risk site visit detector, and security awareness training logs.

Sometimes these controls are only enabled for a subset of users, due to the perceived or real friction they introduce. There is an inherent tradeoff made between the security of humans in an enterprise and certain settings, products, and/or controls which lessen the speed at which humans do their work. Security controls data sources may come from parts of a security and IT technology stack, as described above.

Leveraging an enterprise's existing trove of security data sources is disclosed. Integrating this data determines visibility into individual humans as well as the enterprise at large. The data also may be used to score and evaluate performance historically, predictively, and/or currently in areas such as:

Security Actions Rating: How are humans doing in day to day decisions that they are making?
Security Access Rating: How is access being managed and is the enterprise reducing its blast radius over time?
Security Attack Frequency Rating: How frequently are humans being attacked? Are there cohorts more attacked then others?
Security Control Score: How is the configuration and controls in the enterprise holding up against attack?

These areas may be combined to produce a human risk score, the combination of this information to understand the risk any given human presents to their enterprise. Determining the human risk score and subsequent analysis is designed to answer questions such as:

Where in the enterprise is the next likely successful attack;
Who the riskiest humans are in an enterprise;
Who is most likely to fall for ransomware; and/or
How an enterprise is doing in account compromise risks compared to its industry.

Figure 3:
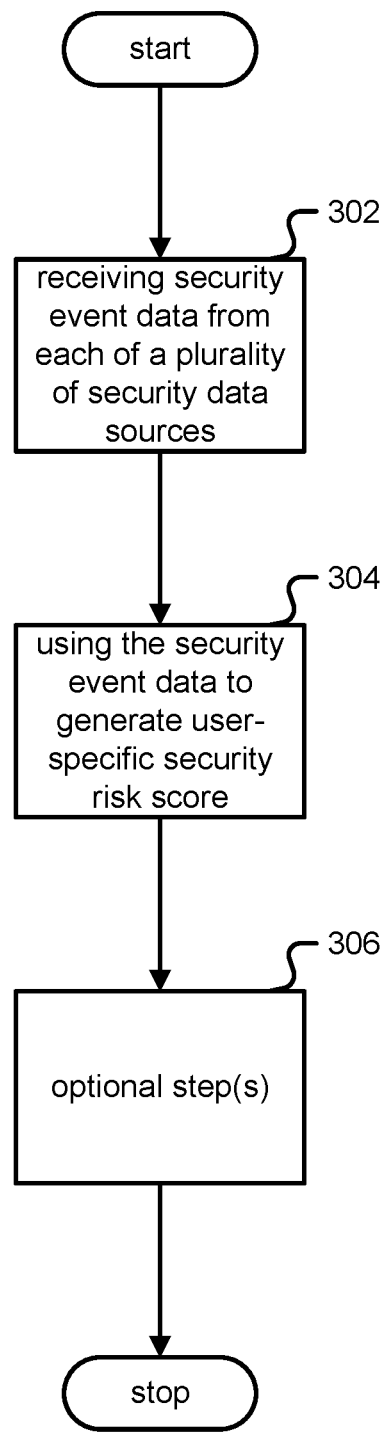
FIG. 3 is a flow diagram illustrating an embodiment of a process for determining visibility into security.

FIG. 3 is a flow diagram illustrating an embodiment of a process for determining visibility into security. In one embodiment, the process of FIG. 3 is carried out by one or more computer/systems of FIG. 1.

In step (302), security event data is received from any of a plurality of security data sources, any unit of security event data being associated with a security event involving one or more human users included in a monitored set of human users.

In step (304), the security event data is used to generate for any of at least a subset of the monitored set of human users a user-specific security risk score that is determined based at least in part on: a level of access to protected resources that a user has; an attack type that has been attempted with respect to the user; and an action taken by the user, as reflected in the security event data associated with the user from two or more of said security data sources.

In one embodiment, security data sources comprise at least one of: people data sources, access data sources, action data sources, and security controls. In one embodiment, people data sources comprise at least one of: directory services, human resource services, identity management solutions, and access management solutions. In one embodiment, access data sources comprise at least one of: access management solutions and directory services.

In one embodiment, action data sources comprise at least one of: real world phishing actions, malware actions, internet browsing actions, sensitive data handling actions, identity security actions, device security actions, physical security actions, phishing simulation test results, and security awareness training logs. In one embodiment, security data sources comprise at least one of: a real world phishing solution, a sensitive data handling solution, a human resources directory data solution, a security information management solution, a security event management solution, an internet browsing solution, a phishing simulations solution, a device security solution, a password security solution, a malware solution, and a password manager solution.

In one embodiment, security data sources comprise at least one of: an identity management solution, a user directory, an active directory, an access management solution, an email gateway, a phishing solution, an endpoint detection, a virus detection solution, a malware detection solution, a web gateway, a firewall, a non-work site visit detector, a known security risk site visit detector, and security awareness training logs.

In one embodiment, a security data source associates a specified risk score modifier with a specified event type. In one embodiment, a security data source associates a specified risk score severity modifier with a specified event type. In one embodiment, a security data source associates a specified risk score modifier with a specified event type, wherein the specified risk score modifier is based at least in part on one of the following: the specified event type, the specified event type and the level of access to protected resources, and the specified event type and the action taken by the user.

In one embodiment, a user-specific security risk score is based at least in part on at least one of the following: a security actions rating, a security access rating, and a security control score. In one embodiment, the security actions rating is based at least in part on at least one of the following: storing passwords outside a password manager, a visit to an inappropriate site, clicking on an email link from a questionable sender, clicking on ad bait, uploading confidential documents to a public cloud service, using a weak password, and sending files from business email to personal email.

In one embodiment, a user-specific security risk score is a vector with multiple components of at least one of the following: a security event type, a threat type, a user access, a user action, and a security event involving the user. In one embodiment, a user-specific security risk score is allocated a default score based at least in part on role function and sensitivity of customer data. In one embodiment, a user-specific security risk score is allocated a default rate of change based at least in part on role function and sensitivity of customer data.

In an optional step (306), the user-specific security risk score is dynamically updated based at least in part on a rapid response to security events involving the user and changes in user behavior, user activity, or user response. Alternately or in addition, in an optional step (306) a composite group security risk score is computed based at least in part on a user-specific security risk score for users associated with a group. Alternately or in addition, in an optional step (306) feedback is communicated to an associated user to explain how a user action has affected the user-specific security risk score.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a communication interface configured to receive a unit of security event data from each of a plurality of security data sources, each unit of the security event data being associated with a security event involving one or more human users included in a monitored set of human users;
   wherein the communication interface is configured to pull a corresponding unit of security event data from on-premise services via an API from at least one of the plurality of security data sources to be synchronized and processed in real-time across other units of security event data; and
   a processor coupled to the communication interface and configured to:
      use a given unit of security event data to generate for each of at least a subset of the monitored set of human users a user-specific security risk score that is determined based at least in part on one or more of:
         a level of access to protected resources that a given user has;
         an attack type that has been attempted with respect to the given user, wherein the attack type comprises at least one of the following: phishing, internet browsing, password security, data handling, and malware; and
         an action taken by the given user, as reflected in the given unit of security event data associated with the given user from two or more of said security data sources, wherein the user-specific security risk score is allocated a default rate of change based at least in part on role function and sensitivity of customer data; and
      publish the user-specific security risk score, at least in part to grant authorization for the given user.

2. The system of claim 1, wherein security data sources comprise at least one of: people data sources, access data sources, actions data sources, and security controls.

3. The system of claim 2, wherein the people data sources comprise at least one of: directory services, human resource services, identity management solutions, and access management solutions.

4. The system of claim 2, wherein the access data sources comprise at least one of: access management solutions and directory services.

5. The system of claim 2, wherein the actions data sources comprise at least one of: real world phishing actions, malware actions, internet browsing actions, sensitive data handling actions, identity security actions, device security actions, physical security actions, phishing simulation test results, and security awareness training logs 6.

6. The system of claim 1, wherein security data sources comprise at least one of: a real world phishing solution, a sensitive data handling solution, a human resources directory data solution, a security information management solution, a security event management solution, an internet browsing solution, a phishing simulations solution, a device security solution, a password security solution, a malware solution, and a password manager solution.

7. The system of claim 1, wherein security data sources comprise at least one of: an identity management solution, a user directory, an active directory, an access management solution, an email gateway, a phishing solution, an endpoint detection, a virus detection solution, a malware detection solution, a web gateway, a firewall, a non-work site visit detector, a known security risk site visit detector, and security awareness training logs.

8. The system of claim 1, wherein a security data source associates a specified risk score modifier with a specified event type.

9. The system of claim 1, wherein a security data source associates a specified risk score severity modifier with a specified event type, wherein the specified risk score severity modifier comprises a critical severity, high severity, and moderate severity.

10. The system of claim 1, wherein a security data source associates a specified risk score modifier with a specified event type, wherein the specified risk score modifier is based at least in part on one of: the specified event type, the specified event type and the level of access to protected resources, and the specified event type and the action taken by the user.

11. The system of claim 1, wherein the user-specific security risk score is based at least in part on at least one of: a security actions rating, a security access rating, and a security control score.

12. The system of claim 11, wherein the security actions rating is based at least in part on at least one of: storing passwords outside a password manager, a visit to an inappropriate site, clicking on an email link from a questionable sender, clicking on ad bait, uploading confidential documents to a public cloud service, using a weak password, and sending a file from business email to personal email.

13. The system of claim 1, wherein the user-specific security risk score is a vector with multiple components of at least one of: a security event type, a threat type, the level of access, the attack type, the action taken by the user, and a security event involving the user.

14. The system of claim 1, wherein the processor is further configured to dynamically update the user-specific security risk score based at least in part on a rapid response to security events involving the user and changes in user behavior, user activity, or user response.

15. The system of claim 1, wherein the user-specific security risk score is allocated a default score based at least in part on a role function and sensitivity of customer data.

16. The system of claim 1, wherein the user-specific security risk score is determined based at least in part on all three of:
    the level of access to protected resources that a given user has;
    the attack type that has been attempted with respect to the given user; and
    the action taken by the given user.

17. The system of claim 1, wherein the processor is further configured to compute a composite group security risk score based at least in part on a user-specific security risk score for users associated with a group.

18. The system of claim 1, wherein the processor is further configured to communicate feedback to an associated user to explain how the action taken by the user has affected the user-specific security risk score.

19. A method, comprising:
    receiving a unit of security event data from each of a plurality of security data sources, each unit of the security event data being associated with a security event involving one or more human users included in a monitored set of human users;
    wherein the communication interface is configured to pull a corresponding unit of security event data from on-premise services via an API from at least one of the plurality of security data sources to be synchronized and processed in real-time across other units of security event data; and
    using a given unit of security event data to generate for each of at least a subset of the monitored set of human users a user-specific security risk score that is determined based at least in part on one or more of:
    a level of access to protected resources that a given user has;
    an attack type that has been attempted with respect to the given user, wherein the attack type comprises at least one of the following: phishing, internet browsing, password security, data handling, and malware; and
    an action taken by the given user, as reflected in the given unit of security event data associated with the given user from two or more of said security data sources, wherein the user-specific security risk score is allocated a default rate of change based at least in part on role function and sensitivity of customer data; and
    publishing the user-specific security risk score, at least in part to grant authorization for the given user.

20. A computer program product embodied in a non-transitory computer readable medium and comprising computer instructions for:
    receiving a unit of security event data from each of a plurality of security data sources, each unit of the security event data being associated with a security event involving one or more human users included in a monitored set of human users;
    wherein the communication interface is configured to pull a corresponding unit of security event data from on-premise services via an API from at least one of the plurality of security data sources to be synchronized and processed in real-time across other units of security event data; and
    using a given unit of security event data to generate for each of at least a subset of the monitored set of human users a user-specific security risk score that is determined based at least in part on one or more of:
    a level of access to protected resources that a given user has;
    an attack type that has been attempted with respect to the given user, wherein the attack type comprises at least one of the following: phishing, internet browsing, password security, data handling, and malware; and
    an action taken by the given user, as reflected in the given unit of security event data associated with the given user from two or more of said security data sources, wherein the user-specific security risk score is allocated a default rate of change based at least in part on role function and sensitivity of customer data; and
    publishing the user-specific security risk score, at least in part to grant authorization for the given user.

* * * * *

UNITED STATES PATENT AND TRADEMARK OFFICE
CERTIFICATE OF CORRECTION

PATENT NO. : 12,149,553 B1
APPLICATION NO. : 17/515051
DATED : November 19, 2024
INVENTOR(S) : Robert Charles Fly et al.

Page 1 of 1

It is certified that error appears in the above-identified patent and that said Letters Patent is hereby corrected as shown below:

In the Claims

At Column 26, Claim number 5, Line number 28, please delete "6" after "logs"

Signed and Sealed this
Fourteenth Day of January, 2025

Derrick Brent
*Acting Director of the United States Patent and Trademark Office*